United States Patent
Muramoto et al.

[11] Patent Number: 5,259,389
[45] Date of Patent: Nov. 9, 1993

[54] ELECTRONIC CLINCAL THERMOMETER

[75] Inventors: Yutaka Muramoto; Makoto Ikeda; Makoto Toriumi, all of Nakai, Japan

[73] Assignee: Terumo Kabushiki Kaisha, Tokyo, Japan

[21] Appl. No.: 28,685

[22] Filed: Mar. 8, 1993

Related U.S. Application Data

[63] Continuation of Ser. No. 777,183, Oct. 16, 1991, abandoned.

Foreign Application Priority Data

Oct. 24, 1990 [JP] Japan ................... 2-284447

[51] Int. Cl.⁵ ............................................. A61B 5/00
[52] U.S. Cl. ................... 128/736; 364/557; 364/413.03; 374/102; 374/107
[58] Field of Search .............. 128/736, 664; 364/413.03, 557, 581, 551.01; 374/169, 170, 171, 102, 103, 104, 107

[56] References Cited

U.S. PATENT DOCUMENTS

| | | | |
|---|---|---|---|
| 4,843,577 | 6/1989 | Muramoto | 364/557 |
| 4,866,621 | 9/1989 | Ono | 364/413.03 |
| 4,877,333 | 10/1989 | Ota et al. | 374/169 |
| 4,878,184 | 10/1989 | Okada et al. | 364/557 |
| 5,015,102 | 5/1991 | Yamaguchi | 374/107 |
| 5,066,141 | 11/1991 | Ikeda et al. | 374/169 |

Primary Examiner—Stephen C. Pellegrino
Assistant Examiner—Guy V. Tucker
Attorney, Agent, or Firm—Frishauf, Holtz, Goodman & Woodward

[57] ABSTRACT

In a predicting-type electronic clinical thermometer, data acquired from a temperature sensor (51) at a very small time interval ($\Delta t$) is read in on a real-time basis, the data is converted into detected temperature (T) by means of a processor (9), the temperature is stored in a memory (7) and a temperature prediction is performed to obtain a predicted temperature (Tp). The rate of change ($\Delta T/\Delta t$) in the detected temperature is obtained based upon the detected temperature (T). The moment at which this rate of change attains a predetermined value is taken as an opportunity to check the temporal fluctuation of the predicted temperature within a fixed reference time range. If the predicted temperature is found to have stabilized, the temperature detection is terminated. If it has not stabilized, the temperature detection is continued. Thus, the process through which an allowable condition for a valid prediction was realized is investigated looking back a predetermined length of time from the moment at which the condition was realized, and the result of the investigation is applied when evaluating the validity of the prediction. As a result, a highly accurate temperature prediction can be performed even if the circumstances in which the thermometer is being used changes during temperature detection.

5 Claims, 7 Drawing Sheets

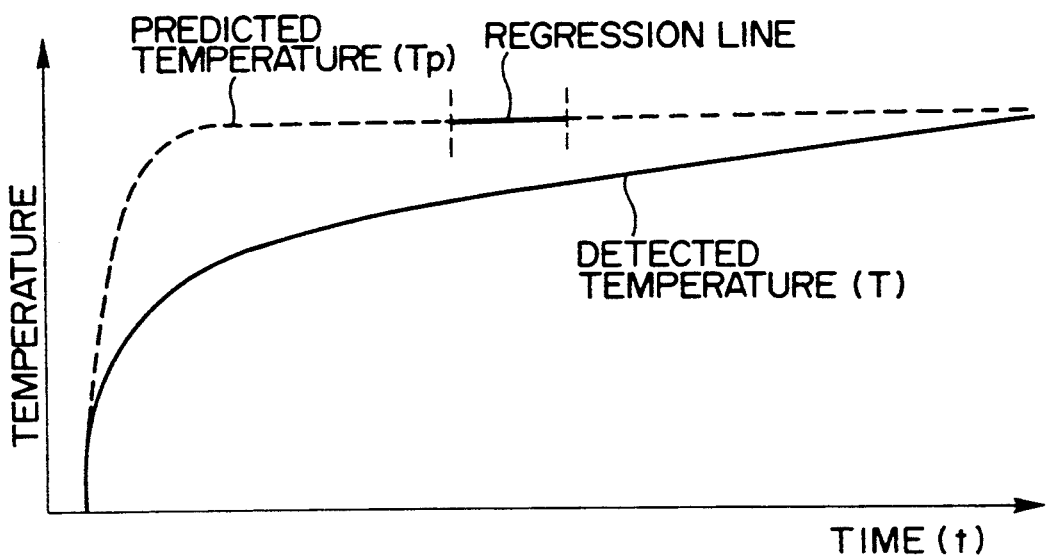
F I G. 6
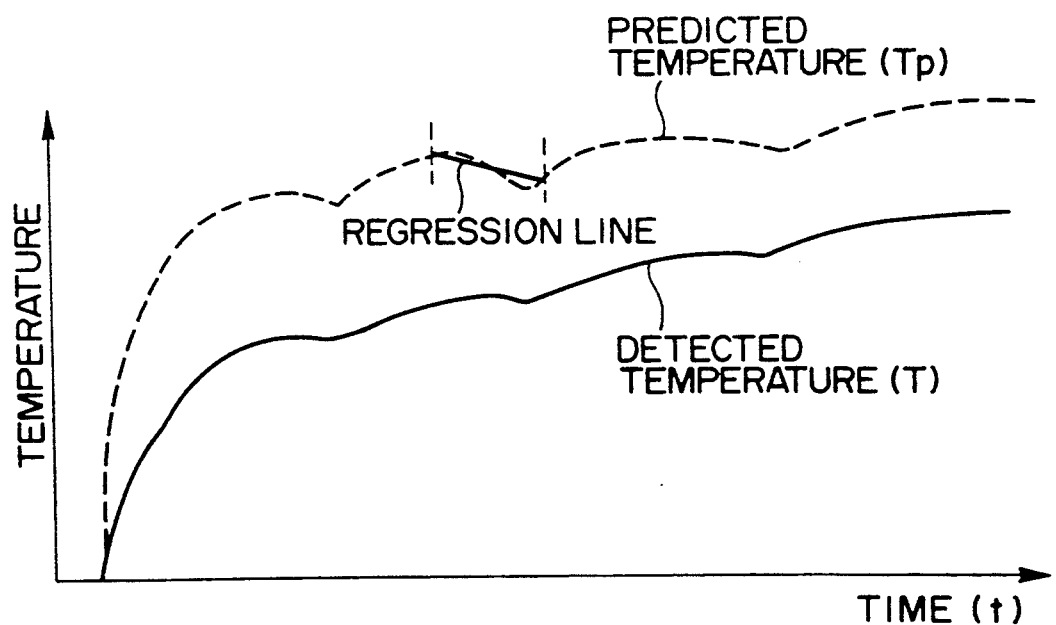
F I G. 7

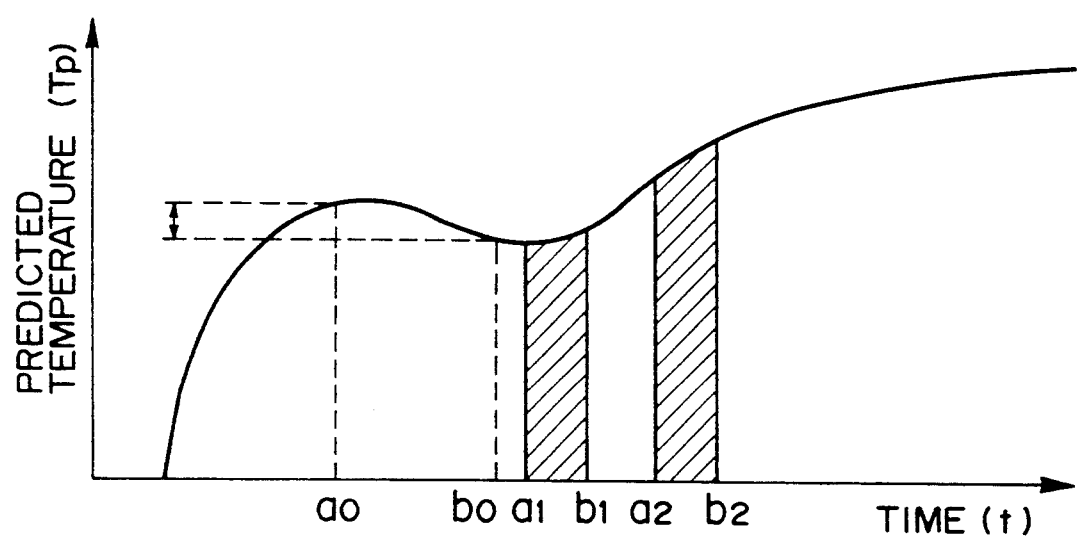
F I G. 8

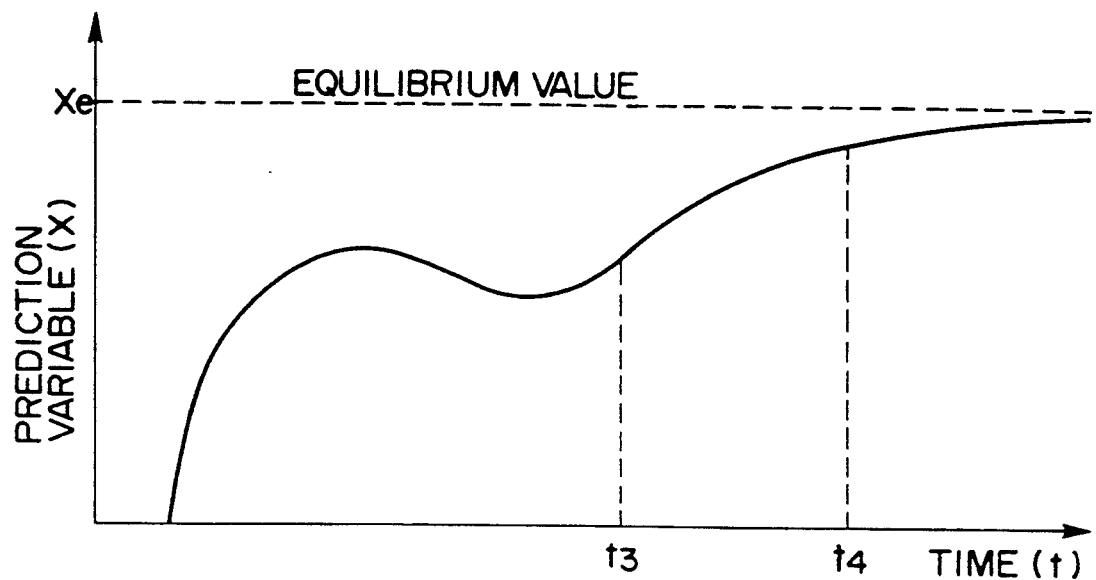
F I G. 9(a)
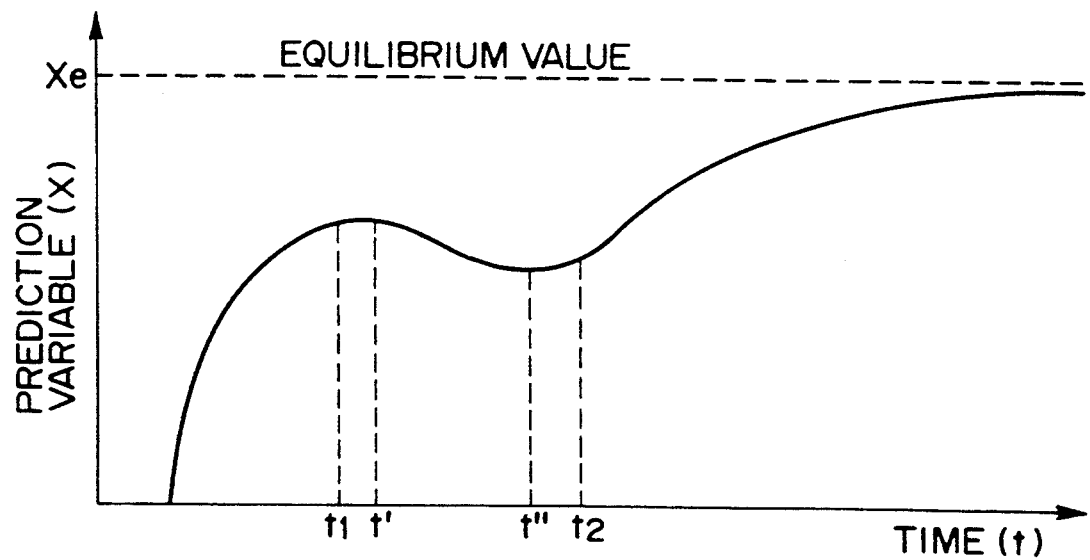
F I G. 9(b)

ELECTRONIC CLINCAL THERMOMETER

This application is a Continuation, of application Ser. No. 07/777,183, filed Oct. 16, 1991, now abandoned.

BACKGROUND OF THE INVENTION

1. Field of the Invention:

This invention relates to an electronic clinical thermometer and, more particularly, to an electronic clinical thermometer of the predicting type.

2. Description of the Prior Art:

According to the prior art, a predicting-type electronic clinical thermometer predicts equilibrium temperature using a prescribed predictive mathematical equation and a condition which should be satisfied in order for a prediction to be valid. If we let t represent time and T a detected temperature, then a predicted equilibrium temperature Y at time t will be given by the following equation:

$$Y(t) = T(t) + U(t) \quad (1)$$

where U represents a bias for prediction.

As described in EP-A No. 290,352 filed May 6, 1988, it can be assumed that the bias value is proportional to time as the first approximation with respect to a certain rate of change in temperature. If the relationship between the bias and time are obtainable with respect to various rates of change in temperature, it can be expressed as follows:

$$U(t) = An \cdot t + Bn \quad (2)$$

$N = 1, N$ where $N$ is the number of $dT/dt$ obtained)

Since the slope (An) and the intercept (Bn) in Eq. (2) can be represented by a linear relationship with respect to the rates of change in temperature, based on a number of experiments of measuring body temperature, An and Bn are given as:

$$An = a(dT/dt) + c \quad (3)$$

$$Bn = b(dT/dt) + d \quad (4)$$

Using Eqs.(2),(3) and (4), the following equation is obtained:

$$U(t) = (at + b)dT/dt + ct + d \quad (5)$$

where
a = 0.04321
b = 0.38085
d = 0.17734.

The condition which should hold for a valid prediction is as follows:

$$dT/dt = 0.30/20 \, (° C/sec) \quad (6)$$

More specifically, when the rate of change in detected temperature with respect to time attains a predetermined value, namely when the aforementioned condition is realized during temperature detection, a buzzer incorporated within the electronic clinical thermometer is sounded to inform the person taking the temperature measurement of the fact that temperature detection has ended.

Though an accurate prediction can be made under fixed conditions in the example of the prior art described above, a change in the circumstances in which the thermometer is being used during temperature detection is not taken into account. Consequently, an accurate predicted temperature cannot be obtained if the circumstances of use change.

The foregoing will be described in greater detail. A curve shown in FIG. 9(a) indicating a change in a prediction variable (X) with time will be considered as an example. In accordance with FIG. 9(a), the prediction variable (X) gradually approaches an equilibrium value (Xe) with the passage of time. Therefore, the rate of change in the prediction variable with time (namely $dX/dt$) approaches "0" as the variable (X) approaches the equilibrium value (Xe). For example, $dX/dt$ takes on a positive value and decreases monotonously from time $t_3$ to time $t_4$. However, when $dX/dt$ is considered from time $t_1$ to $t_2$, as shown in FIG. 9(b), $dX/dt$ takes on a positive value and increases monotonously from time $t_1$ to time $t'$, and X attains its maximum value at time $t'$. Further, $dX/dt$ takes on a negative value and decreases monotonously from time $t'$ to time $t''$, and X attains its minimum value at time $t''$. From time $t''$ to time $t_2$, $dX/dt$ takes on a positive value and increases monotonously.

Assume that the foregoing variable (X) is applied to a predicted temperature (Tp). If the position of the tip of the probe at the end of the electronic clinical thermometer should happen to shift because of a change in the manner in which the thermometer is being held in the subject's armpit, for example, then the rate of change in the detected temperature with time (i.e., $dT/dt$) at this moment will suddenly decline and a state corresponding to the time region $t_1-t_2$ shown in FIG. 9 will occur. In other words, the condition for a valid prediction expressed by Eq. (6) above happens to be satisfied and a value much lower than the equilibrium value which would have been attained originally is regarded as being the predicted temperature. Thus, there is a decline in the accuracy of prediction.

SUMMARY OF THE INVENTION

Accordingly, an object of the present invention is to provide an electronic clinical thermometer in which prediction accuracy is maintained even if there is a change in the condition of use during temperature detection.

According to the present invention, the foregoing object is attained by providing an electronic clinical thermometer for measuring the body temperature of a region whose temperature is to be measured, comprising temperature detecting means for measuring the temperature of the region at a predetermined time interval, memory means for storing the body temperature, predicting means for predicting a predicted equilibrium temperature based upon the body temperature measured by the temperature detecting means, time detecting means for detecting a time at which a rate of change in the body temperature with time attains a predetermined value, calculating means for calculating a temporal fluctuation in the predicted equilibrium temperature within a predetermined time range in which the time detected by the time detecting means serves as a reference, comparing means for comparing the temporal fluctuation in the predicted equilibrium temperature calculated by the calculating means with a predetermined comparison value, and display control means which, based upon results of the comparison performed by the comparing means, is for displaying the predicted equilibrium temperature obtained at the time detected by the time detecting means, and controlling the temperature measurement performed by the temperature detecting means.

According to the present invention constructed as described above, the moment at which the rate of change in the measured temperature with time attains the predetermined value is taken as an opportunity to check the temporal fluctuation of the predicted equilibrium temperature within a fixed reference time range. If the predicted equilibrium temperature is found to have stabilized, the temperature detection is terminated. If the predicted equilibrium temperature has not stabilized, the temperature detection is continued.

In accordance with the present invention, as described above, the process through which an allowable condition for a valid prediction was realized is investigated looking back a predetermined length of time from the moment at which the condition was realized, and the result of the investigation is applied when evaluating the validity of the prediction. As a result, a highly accurate temperature prediction can be performed even if the circumstances in which the thermometer are being used change during temperature detection.

Other features and advantages of the present invention will be apparent from the following description taken in conjunction with the accompanying drawings, in which like reference characters designate the same or similar parts throughout the FIGURES thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 6 is a diagram illustrating a regression line in a case where detected temperature is stable;

FIG. 7 is a diagram illustrating a regression line in a case where detected temperature is not stable;

FIG. 8 is a diagram illustrating another definition of degree of stability; and

FIGS. 9($a$) and 9($b$) are diagrams illustrating a temporal change in a prediction variable according to an example of the prior art.

DESCRIPTION OF THE PREFERRED EMBODIMENT

A preferred embodiment of the present invention will now be described in detail in accordance with the accompanying drawings.

Figure 1:
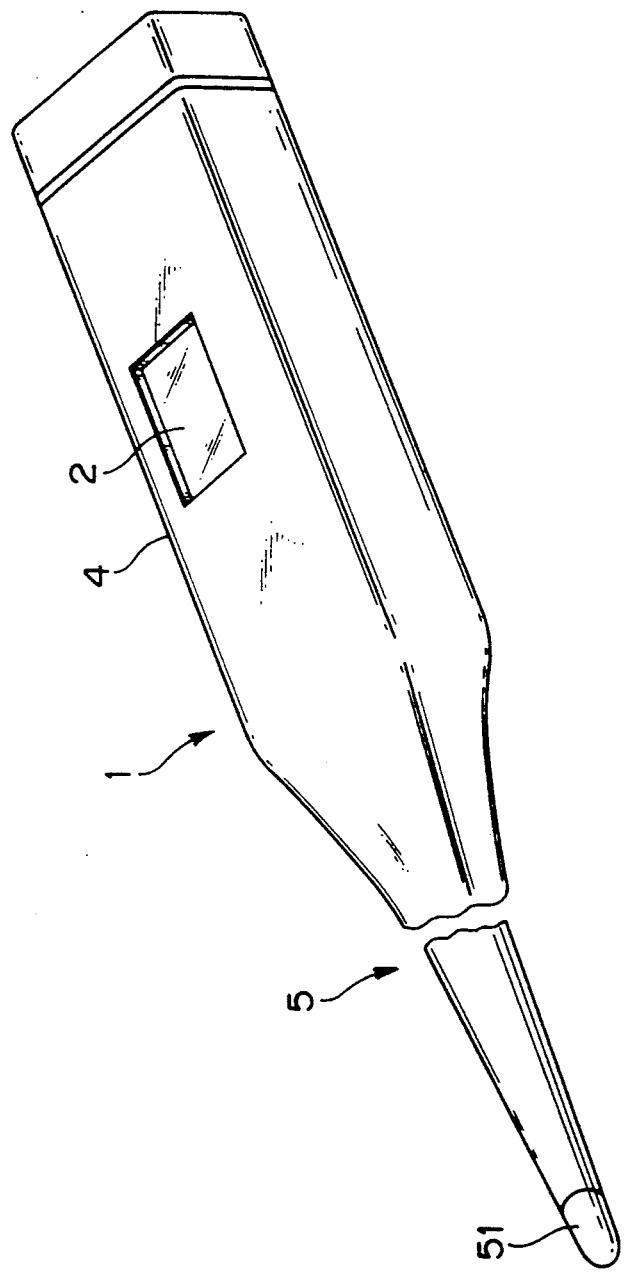
FIG. 1 is an external view showing an electronic clinical thermometer which is a typical embodiment of the present invention.
Figure 2:
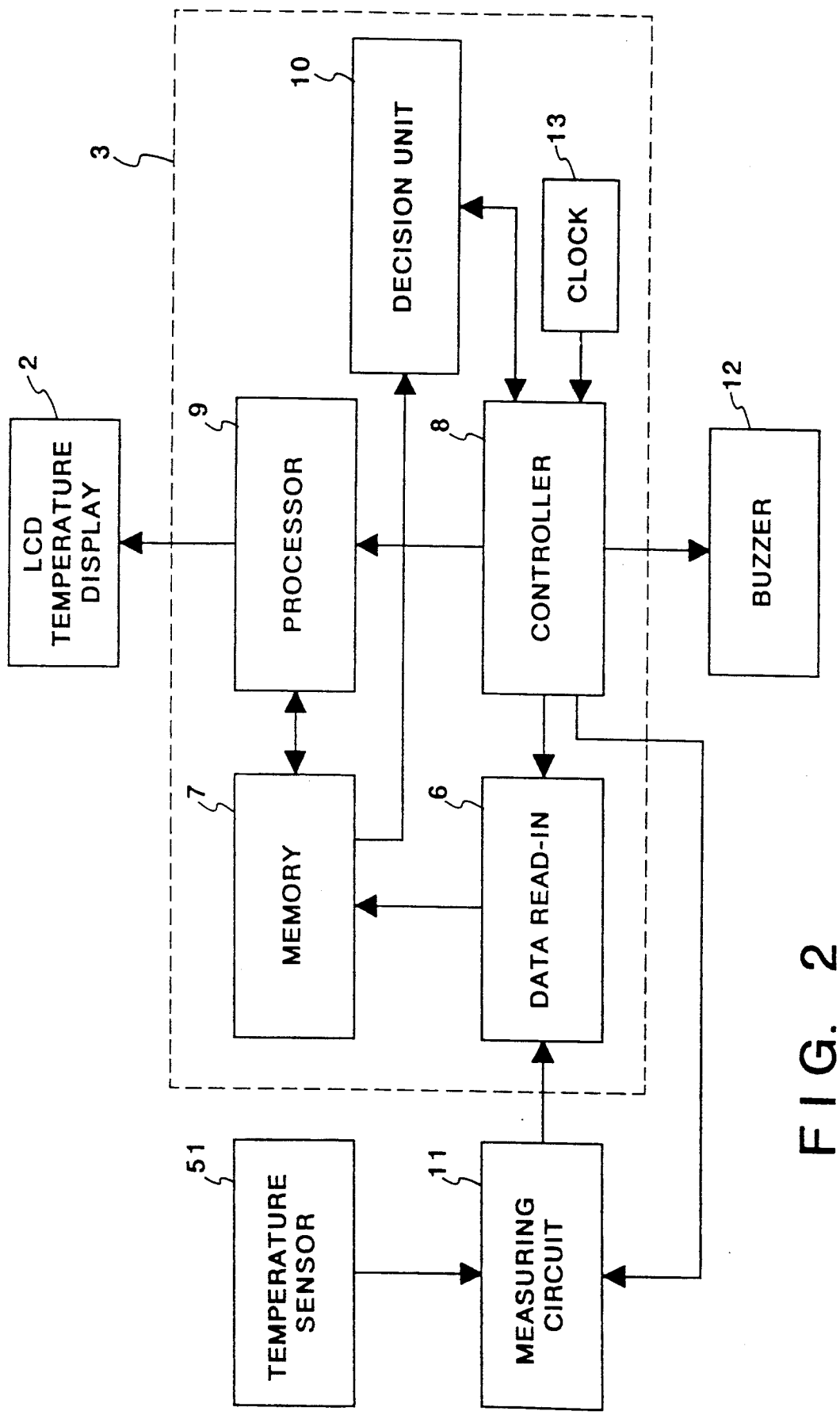
FIG. 2 is a block diagram illustrating in detail the construction of the main unit of the electronic clinical thermometer.

FIG. 1 is an external view of an electronic clinical thermometer 1 illustrative of a typical embodiment of the present invention. In FIG. 1, numeral 2 denotes a LCD temperature display unit, 4 a main unit accommodating a predicting block 3, a temperature measuring circuit 11 and a buzzer 12, 5 a probe and 51 a temperature sensing unit. As shown in FIG. 2, the predicting block 3 is constituted by a data read-in unit 6, a memory 7, a controller 8, a processor 9, a decision unit 10 and a clock 13.

Figure 3:
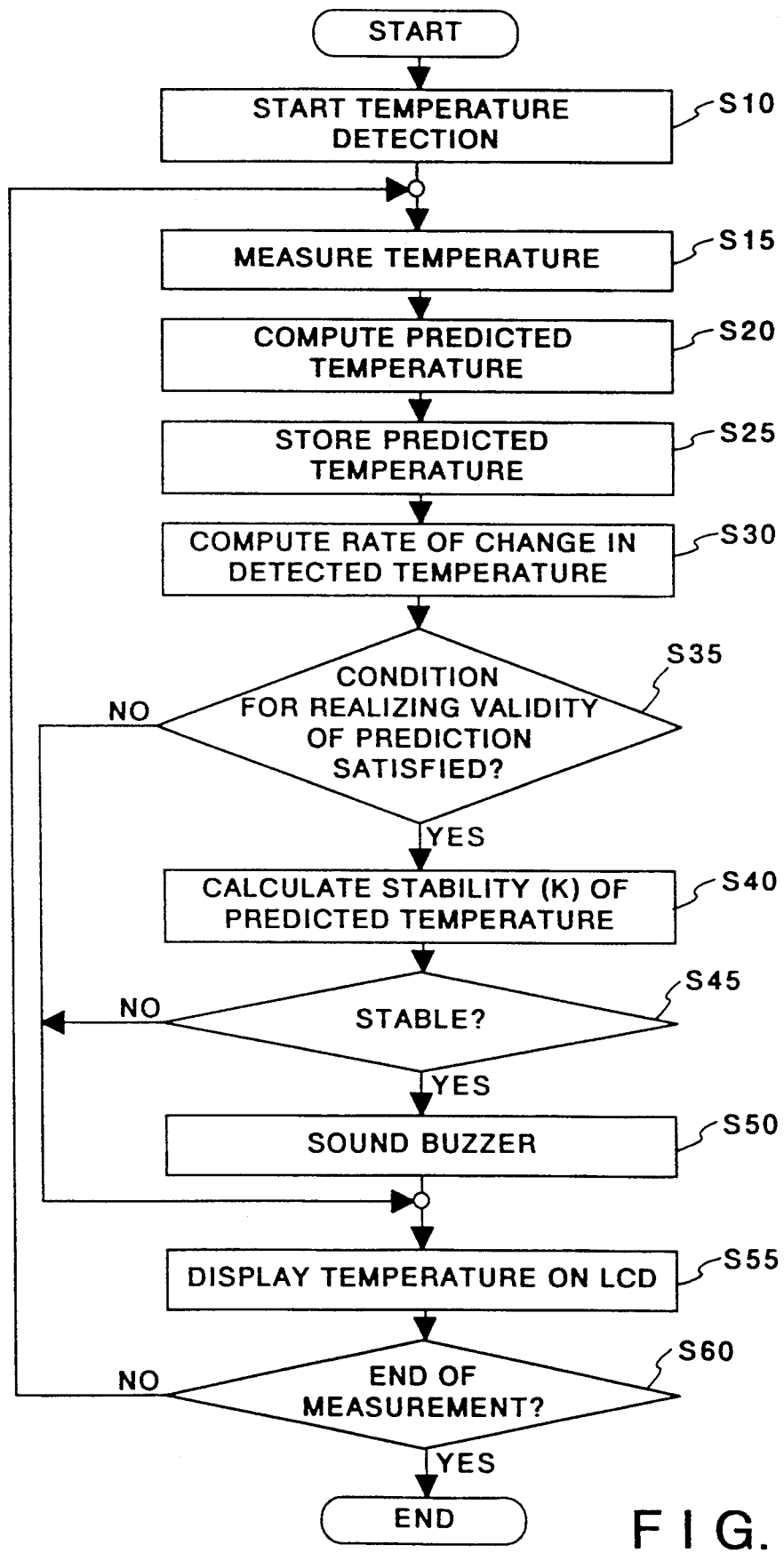
FIG. 3 is a flowchart illustrating a temperature predicting procedure.

The flowchart shown in FIG. 3 will be used to describe a procedure for temperature prediction executed by the electronic clinical thermometer having the construction set forth above.

Figure 4:
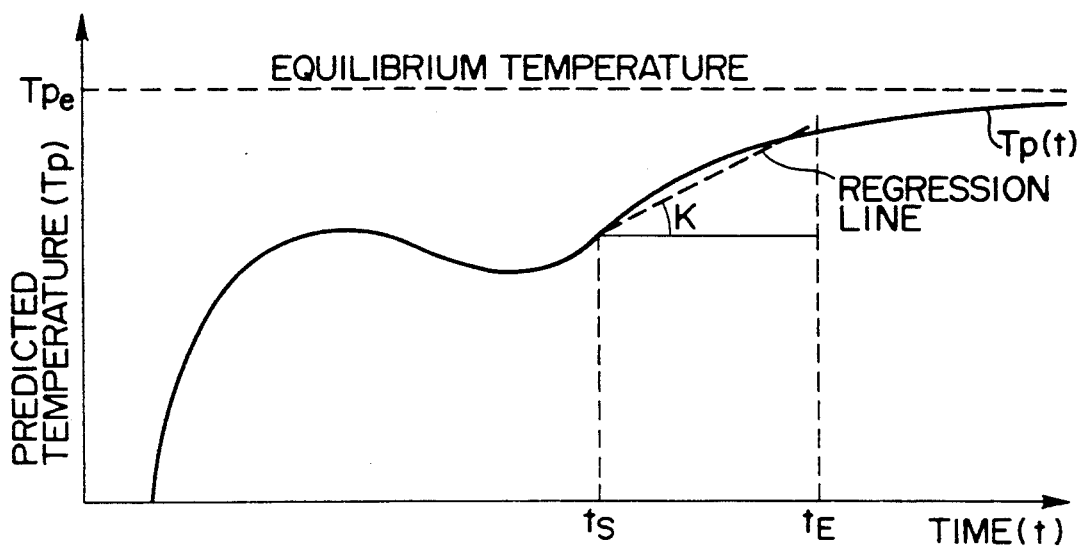
FIG. 4 is a diagram illustrating the degree of stability of predicted temperature.

The basic approach of this embodiment is to investigate the stability of predicted temperature from a change in the predicted temperature with time during detection of the temperature. Accordingly, let Tp represent the predicted temperature. In this embodiment, Eq. (3) is deemed to be the condition which must hold for realizing the validity of a prediction. Further, as illustrated in FIG. 4, the degree (K) of stability of predicted temperature is defined as being the value of the slope of a regression line obtained using the method of least squares in a closed interval [$t_S$, $t_E$] of a curve Tp(t) representing a change in the predicted temperature ($T_p$) with time.

First, when temperature detection starts at step S10 of the flowchart, the measuring circuit 11 acquires data from the temperature sensing unit 51, in response to control by the controller 8, at a very small time interval ($\Delta t$) at step S15. Next, at step S20, the predicting block 3 reads in the acquired data in real-time through the data read-in unit 6, converts the data into temperature (detected temperature T) by means of the processor 9, stores this temperature in the memory 7 and performs a temperature prediction to obtain the predicted temperature (Tp). The predicted temperature (Tp) thus obtained is stored in the memory 7 at step S25. The rate of change ($\Delta T/\Delta t$) in the detected temperature is then obtained at step S30.

This is followed by step S35, at which the decision unit 10 examines whether the rate of change ($\Delta T/\Delta t$) in the detected temperature satisfies the condition which must hold for realizing the validity of a prediction. If this condition is satisfied, the program proceeds to step S40. If the condition is not satisfied, the program proceeds to step S55, where the predicted temperature (Tp) prevailing at this time is displayed on the LCD temperature display unit 2. It is then decided at step S60 to continue temperature detection, after which the program returns to step S15.

Figure 5:
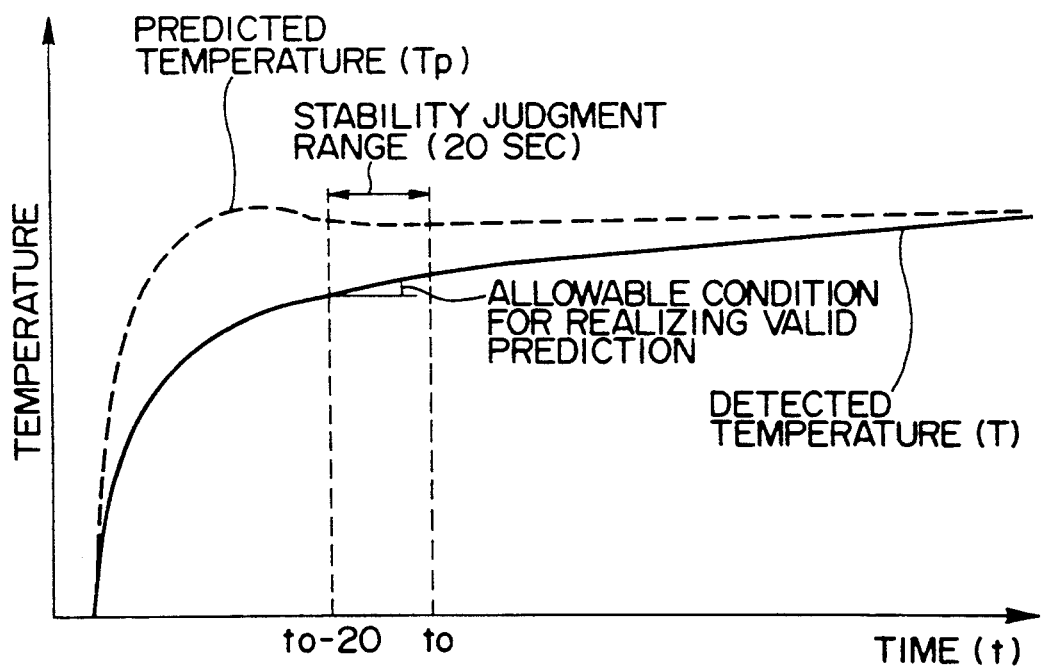
FIG. 5 is a diagram illustrating a range over which the degree of stability of predicted temperature is judged.

Step S40 calls for the processor 40 to compute the degree (K) of stability of the predicted temperature (Tp). In this embodiment, as illustrated in FIG. 5, a period of time adopted for judging degree of stability is that extending back 20 seconds from the moment ($t_0$) at which the condition for realizing the validity of a prediction is satisfied. More specifically, the degree (K) of stability is obtained from the closed interval [$t_0$-20 (sec), $t_0$] of the predict (TP(t)). If the change in the detected temperature (T) with time makes an ideal transition without being influenced from the outside, then the degree (K) of stability will possess a value approximating "0" and, as shown in FIG. 6, the regression line will come near to being parallel with the time axis. On the other hand, if there is an external influence, the condition for realizing the validity of a prediction will be satisfied only temporarily, and the degree of stability (K) will take on a value remote from "0". As a result, the regression line will exhibit a large slope, as shown in FIG. 7.

Next, at step S45, the decision unit 10 compares the value of stability (K) with a predetermined reference value (KA). If the result is that the value of stability (K) is less that the reference value (KA), the program proceeds to step S50, where it is deemed that the predicted temperature is sufficiently accurate and the buzzer 12 is sounded to inform the user of the fact that temperature detection has ended. The predicted temperature (Tp) is displayed on the LCD temperature display unit 2 at step S55, after which it is decided at step S60 to halt temperature detection. If the value of stability (K) is found to be greater than the reference value (KA), however, then the program proceeds from step S45 to step S55, where the predicted temperature (Tp) prevailing at this time is displayed on the LCD temperature display unit 2. It is then decided at step S60 to continue temperature detection, after which the program returns to step S15. Temperature detection is continued at step S15 until the value of stability (K) becomes sufficiently small.

In this embodiment, $KA \leq 0.04(°C)/20$ sec is used as the reference value (KA).

Thus, in accordance with this embodiment, the process through which an allowable condition for a valid prediction was realized is investigated looking back a predetermined length of time from the moment at which the condition was realized. This makes it possible to obtain a highly accurate predicted temperature that is not susceptible to the effects of a temporary change in detected temperature.

Only a preferred embodiment of the present invention is described above. For example, the degree (K) of stability of predicted temperature is defined as being the value of the slope of the regression line obtained using the method of least squares in the closed interval $[t_S, t_E]$ of the curve Tp(t) representing a change in the predicted temperature ($T_p$) with time. However, this does not impose a limitation upon the present invention. For example, as the degree (K) of stability, it is possible to use an intercept of the aforesaid regression line or, as illustrated in FIG. 8, the difference between maximum and minimum values of the predicted temperature ($T_p$) in the closed interval $[o, b_0]$, the difference between the mean value of the predicted temperature ($T_p$) and the maximum value or minimum value in the closed interval $[a_0, b_O]$, or a value obtained by integrating the predicted-temperature curve (Tp) with regard to the closed interval $[a_i, b_i]$ (i=1, 2 in FIG. 8).

As many apparently widely different embodiments of the present invention can be made without departing from the spirit and scope thereof, it is to be understood that the invention is not limited to the specific embodiments thereof except as defined in the appended claims.

What is claimed is:

1. An electronic clinical thermometer for measuring body temperature of a given region of a body comprising:
   temperature detecting means for measuring said body temperature of the region in a predetermined time interval;
   memory means for storing a signal corresponding to said body temperature;
   predicting means for predicting an equilibrium temperature based upon said body temperature measured by said temperature detecting means;
   first calculating means for calculating a rate of change in said body temperature with time;
   first comparing means for comparing said rate of change with a predetermined value;
   time detecting means for detecting a time when said rate of change reaches said predetermined value, based on results of the comparison by said first comparing means;
   second calculating means for calculating a rate of change in said predicted equilibrium temperature with time as a stability index of whether said predicted equilibrium temperature has stabilized within a predetermined time range in the time detected by said time detecting means which serves as a reference;
   second comparing means for comparing said rate of change in said predicted equilibrium temperature calculated by said second calculating means with a predetermined comparison value in order to examine whether said predicted equilibrium temperature has stabilized;
   display means for displaying said predicted equilibrium temperature obtained by said predicting means; and
   control means for controlling the temperature measurement performed by said temperature detecting means in a manner such that when said predicted equilibrium temperature has stabilized, the temperature measurement is terminated, while when said predicted equilibrium temperature is still unstable, the temperature measurement is continued, based on results of the comparison performed by said second comparing means.

2. The thermometer according to claim 1, wherein said second calculating means includes:
   means for obtaining a regression line of a time variation in the predicted equilibrium temperature; and
   means for employing the slope of said regression line as the stability index.

3. The thermometer according to claim 1, wherein said second calculating means includes:
   means for obtaining a regression line of a time variation in said predicted equilibrium temperature within a predetermined time range; and
   means for employing an intercept of said regression line as the stability index.

4. The thermometer according to claim 1, wherein said second calculating means includes:
   means for obtaining a value of the difference between a maximum value and a minimum value of said predicted equilibrium temperature, a value of the difference between the mean value of said predicted equilibrium temperature and the maximum value, or a value of the difference between the mean value of said predicted equilibrium temperature and the minimum value within said predetermined time range; and
   means for employing an obtained value as the stability index.

5. The thermometer according to claim 1, wherein said second calculating means includes:
   means for calculating a value, which is the result of integrating, with regard to a predetermined closed interval, of a curve indicative of a change in the prediction equilibrium value with time obtained from the time variation in said predicted equilibrium temperature within said predetermined time range; and
   means for employing the calculated value as the stability index.

* * * * *

UNITED STATES PATENT AND TRADEMARK OFFICE
CERTIFICATE OF CORRECTION

PATENT NO. : 5,259,389

DATED : November 9, 1993

INVENTOR(S) : Yutaka MURAMOTO et al

It is certified that error appears in the above-identified patent and that said Letters Patent is hereby corrected as shown below:

In the Title Page, item [56] References Cited,

Under U. S. PATENT DOCUMENTS, insert:

```
4,629,336    12/1986    Ishizaka    374/169
4,648,055     3/1987    Ishizaka    364/557
```

Under FOREIGN PATENT DOCUMENTS, insert:

```
0 413,814A1    2/1991    EPA
0 332 700      9/1989    Europe
0 290 352     11/1988    Europe
```

Column 6, line 33 (Claim 2)

after "temperature" insert,

--within a predetermined time range;--

Signed and Sealed this

Twentieth Day of December, 1994

Attest:

BRUCE LEHMAN

Attesting Officer

Commissioner of Patents and Trademarks